Oct. 19, 1954 W. SELBY 2,691,859
VINE CUTTING UNIT
Filed Dec. 26, 1952 2 Sheets-Sheet 1
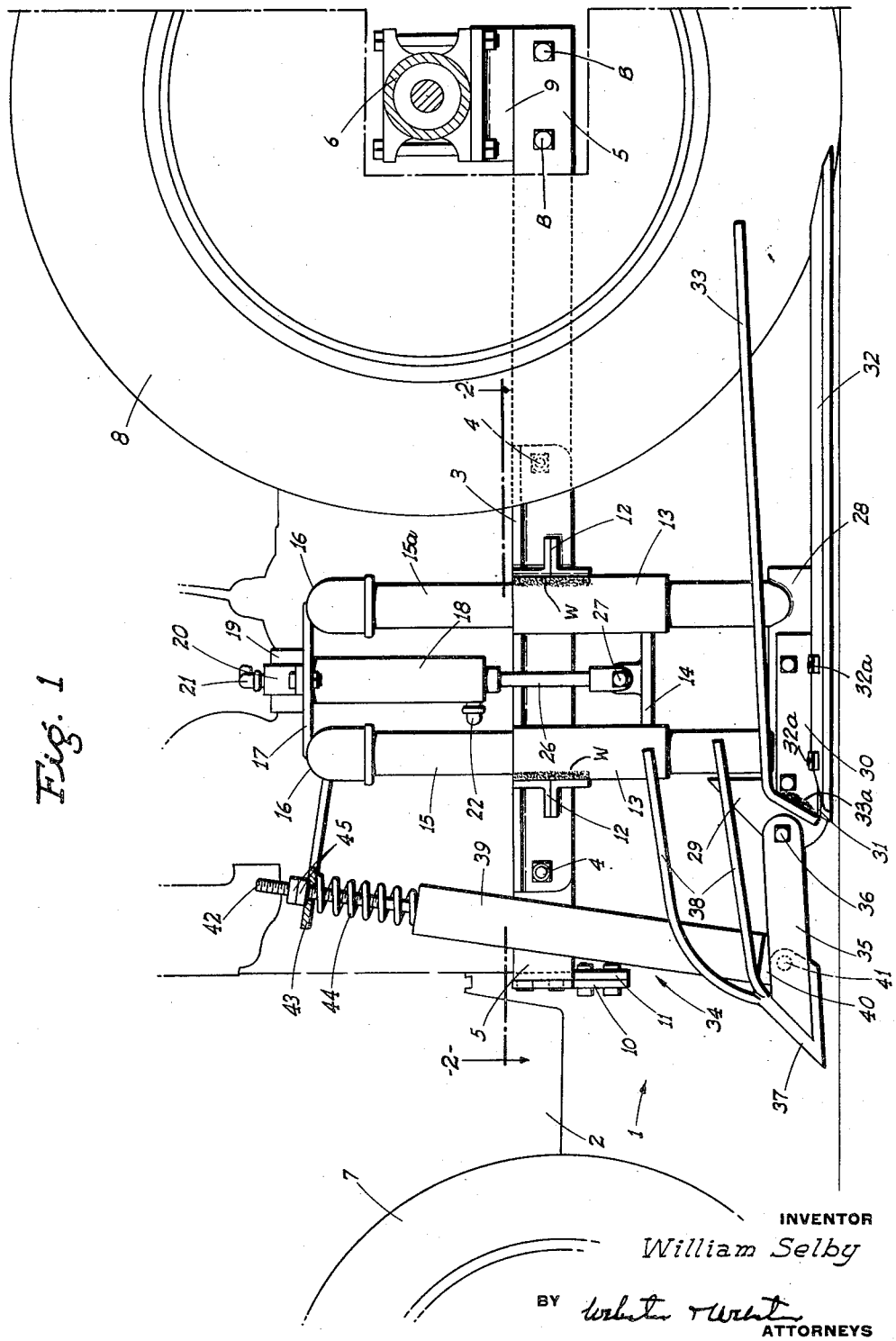
INVENTOR
William Selby
BY
ATTORNEYS Oct. 19, 1954 W. SELBY 2,691,859
VINE CUTTING UNIT
Filed Dec. 26, 1952 2 Sheets-Sheet 2
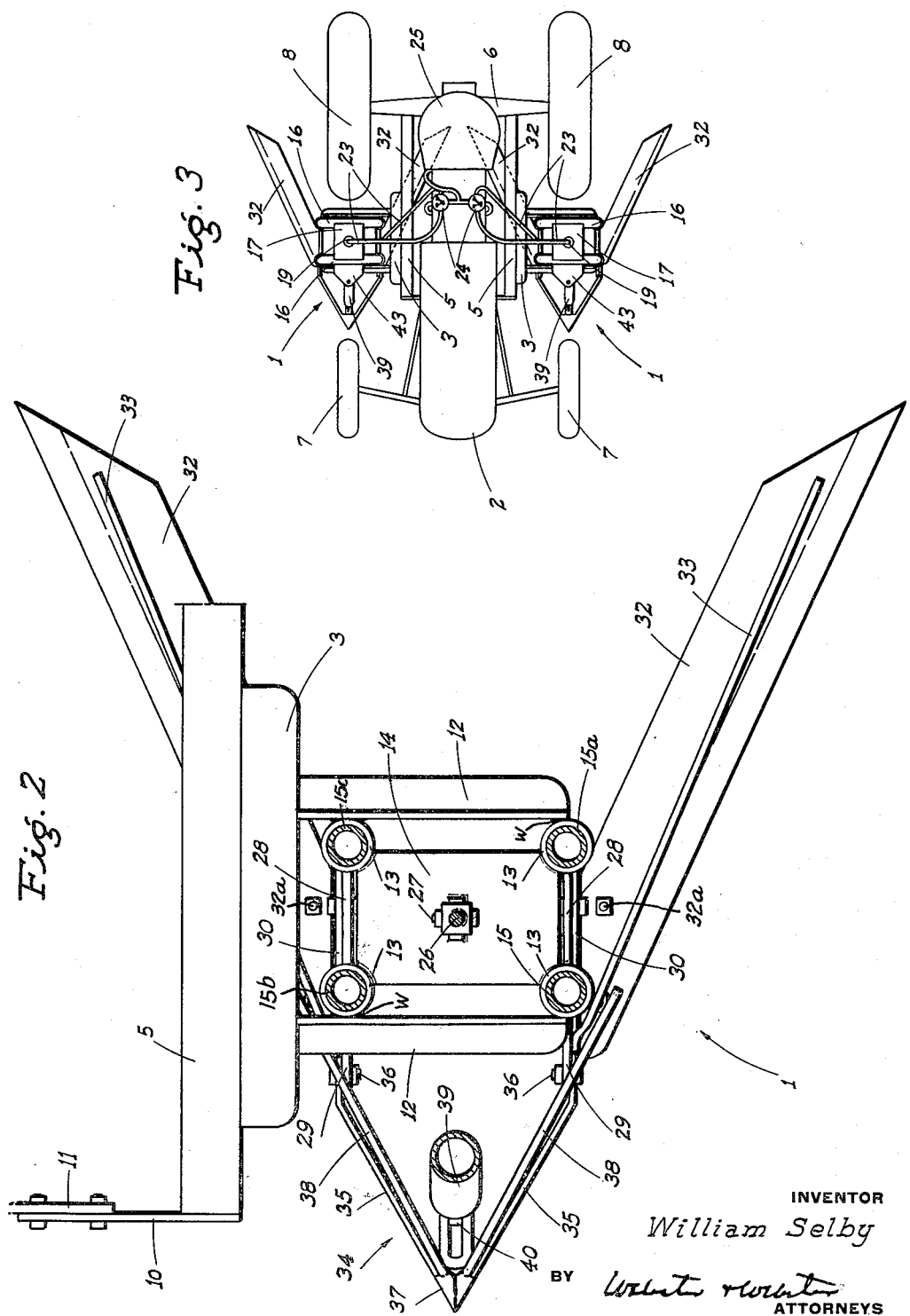
INVENTOR
William Selby
BY
ATTORNEYS Patented Oct. 19, 1954

2,691,859

UNITED STATES PATENT OFFICE 2,691,859

VINE CUTTING UNIT

William Selby, Escalon, Calif.

Application December 26, 1952, Serial No. 327,965

2 Claims. (Cl. 56—1)

The present invention is directed to, and it is a major object to provide, a tractor mounted, vine cutting unit of novel construction and function; such unit being especially designed—but not limited—for use to cut bean vines growing along crop rows.

Another important object of the present invention is to provide a vine cutting unit which includes a novel mount adapted to rigidly but detachably support the unit from a wheel type tractor intermediate the front and rear wheels thereof; a pair of such units preferably being used, one on each side of the tractor.

An additional object of the invention is to provide a vine cutting unit, of the type described, which is vertically adjustable between a raised transport position, and a lowered working position at a selected level relative to the adjacent crop rows from which the vines are to be cut.

A further object of the invention is to provide a vine cutting unit, as in the preceding paragraph, wherein such unit is adjustable up or down by means of a fluid pressure actuated power cylinder arranged in effective combination with the novel vertical guide mechanism which the unit embodies.

A still further object of the invention is to provide a vine cutting unit which includes a vertically floatable divider assembly disposed in leading relation to the unit, and adapted to separate or divide the vines between the crop rows to prevent their entangling the unit, and to facilitate cutting of the vines from said crop rows by the trailing divergent cutting blades.

It is also an object of the invention to provide a vine cutting unit designed for ease and economy of manufacture, installation, and operation.

Still another object of the invention is to provide a practical and reliable vine cutting unit, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of one of the vine cutting units as mounted on a tractor for use; the rear tractor wheel being broken away to show the mounting for the frame beam of the cutting unit on the axle housing, the latter being shown in section.

Fig. 2 is an enlarged sectional plan view taken on line 2—2 of Fig. 1.

Fig. 3 is a diagrammatic plan view on a reduced scale of a tractor having a pair of said units mounted thereon, one on each side of the tractor.

Referring now more particularly to the characters of reference on the drawings, it is preferred that a pair of the vine cutting units, each of which is indicated at 1, be mounted on opposite sides of a wheel type tractor 2; such dual mounting of the units being illustrated diagrammatically in Fig. 3.

However, as the vine cutting units 1 are of the same construction, except right and left hand, a description of one will suffice for both.

Each vine cutting unit comprises a relatively short, longitudinal attachment bar 3 removably secured by bolts 4 to an elongated, longitudinal push beam 5 which extends alongside the tractor from adjacent the rear axle housing 6 to a front end termination intermediate the front wheels 7 and rear wheels 8 on the adjacent side of the tractor.

At the rear end the longitudinal push beam 5 is secured by bolts B to an attachment flange 9 which fixedly depends from the rear axle housing 6. At the forward end thereof the longitudinal push beam 5 includes a laterally inwardly extending arm 10 bolted to the attachment flange 11 which is conventionally included at the front of the flywheel housing of the tractor.

A pair of supporting arms 12 are fixed to and project laterally outwardly from the attachment bar 3 in spaced relation, and such supporting arms are welded as at W to four vertically extending guide sleeves 13 disposed in rectangular arrangement with two thereof affixed to each arm 12, and which sleeves are connected adjacent their lower ends by a rigid bottom plate 14.

Plungers 15, 15a, 15b, and 15c correspond to, and slidably engage through, the guide sleeves 13; such plungers being of substantially greater length than said sleeves, and extending a distance both above and below the same.

At their upper ends the front and rear pairs of said plungers 15, 15c are connected by cross members 16, and in turn the latter are fixed together by a horizontal head plate 17 welded thereto.

Such horizontal head plate 17 is formed with a central bore through which a fluid pressure actuated power cylinder 18 depends; such cylinder having a head 19 which rests on the plate 17, being secured thereto by a yoke 20.

The power cylinder 18 is of double acting type and includes a top fitting 21 and a bottom fitting 22. Flexible conduits 23 lead from the fittings 21 and 22 to a valve 24 mounted on the tractor for easy reach by the operator from the tractor seat 25. The valve 24 is of the conventional four-way turnable rotor type adapted to feed fluid pressure selectively to either conduit 23, while opening the other for return. The valve 24 has suitable feeding and return conduits connected between the same and the conventional fluid pressure system on the tractor.

The power cylinder 18 includes a downwardly projecting piston rod 26 pivotally connected, as at 27, substantially centrally to the bottom plate 14, whereby upon actuation of the power cylinder 18 to extend the same, the plungers 15 ride upwardly through the guide sleeves 13, while contraction of said power cylinder works the plungers 15, 15c downwardly through such sleeves.

At the lower ends thereof the inner and outer pairs of the plungers 15, 15c each are fixed to a longitudinally extending, vertically disposed runner plate 28 having an upturned forward tip 29. Intermediate the ends thereof, and on the laterally outer sides, the runner plates 28 are fitted with longitudinal angle irons 30, whose lower and outwardly projecting flange 31 is sloped downwardly and outwardly to a slight degree, as shown.

Elongated cutting blades 32 are secured at their forward ends by bolts 32a to the flanges 31 and thence diverge rearwardly, as shown; extending on opposite sides of the related rear wheel 8 of the tractor.

A deflector rod 33 is fixed at 33a to the forward end of each angle iron 30 and thence extends rearwardly in spaced relation above the corresponding, divergent cutting blade 32.

A vine divider assembly, indicated generally at 34, leads the unit directly to the rear of the related front wheel 7, and is constructed as follows:

A substantially V-shaped, forwardly projecting swing frame 35 is disposed ahead of the angle irons 30; such swing frame 35 being pivoted at its rear ends, as at 36, to the upturned forward tips 29 of said angle irons 30. At the forward end thereof the triangular swing frame 35 carries a forwardly projecting shoe point 37, and pairs of vertically spaced vine deflector rods 38 diverge rearwardly from the shoe point 37, terminating at their rear ends in a plane above the forward end of the corresponding deflector rod 33.

A vertically elongated divider 39, preferably circular in cross section, upstands from the swing frame 35 directly rearwardly of the shoe point 37; such divider 39 being formed, at its lower end, with an ear 40 transversely pivoted to the swing frame 35, as at 41.

The divider 39 has a slight rearward inclination towards its upper end, and at such upper end the divider includes an upstanding rod 42 which slidably extends through a plate 43 which projects in fixed relation from the foremost cross member 16. A compression spring 44 surrounds the rod 42 between the plate 43 and the upper end of the divider 39; such spring serving to yieldably urge the divider 39, together with the swing frame 35 and shoe point 37, to its lowermost position, which lowermost position is determined by nuts 45 threaded on the rod above said plate 43.

In operation of the above described vine cutting unit, each thereof functions as follows upon advance of the tractor; the tractor wheels running between adjacent crop rows.

As the tractor advances, the shoe point 37 works close to the bottom of the furrow between such adjacent crop rows, initially lifting the entangled vines, whence they are engaged and separated by the divider 39; the separated vines being deflected laterally by the rods 38. The rearwardly divergent cutting blades 32 sweep along the top of such adjacent crop rows, effectively cutting the vines from the roots; the cut vines being deflected laterally by the rods 33 to prevent their entanglement with the rear wheels 8 of the tractor.

By reason of the described mount for the cutting blades 32, including the plungers 15, 15c working in the guide sleevse 13, and the power cylinder coupled between said sleeves 13 and plunger 15, 15c the cutting blades 32 can be effectively and positively adjusted to proper level at a lowered position, or can be raised to a nonworking position for transport.

Additionally, with the described vine divider assembly 34 the latter works effectively in any position of vertical adjustment of the cutting blades 32; this for the reason that such vine divider assembly adjusts up or down with the plungers 15, 15c.

As a pair of the valves 24 are employed when the units are used dual on a tractor, it is possible to adjust each unit independently and as working conditions may require.

The described vine cutting unit thus provides a very practical and reliable implement for the intended purpose, and when it is desired to use the tractor without the vine cutting unit it is only necessary to detach the bar 3 by removal of the bolts 4, accompanied by uncoupling of the flexible conduits 23.

From the foregoing description it will be readily seen that there has been produced such a device as substantially fulfills the objects of the invention, as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. A vine cutter comprising a pair of horizontal rearwardly diverging blades, supporting means for the blades including upstanding members and shoes on the blades at their forward end connected to said members, a divider unit ahead of the blades and including a V-shaped swing frame having side members just above and substantially alined with the outer edge of the blades, means pivoting the last named members on the shoes, and means between the swing frame and the upstanding members of the supporting means to yieldably allow of upward movement of the divider unit while limiting downward movement of the same; said last named means including a divider element upstanding from adjacent the forward end of the swing frame, means pivoting the element at its lower end on the swing frame, a plate rigid with and projecting from said upstanding members on the blade supporting means above and overlying the divider element, a rod upstanding from said element and slidably projecting through the plate, and adjustable stops on the rod above the plate.

2. A structure as in claim 1, with a compression spring on the rod between the plate and the upper end of the divider element.

References Cited in the file of this patent

UNITED STATES PATENTS

| Number | Name | Date |
|---|---|---|
| 1,277,257 | Poterfield | Aug. 27, 1918 |
| 1,893,863 | Kerns | Jan. 10, 1933 |
| 1,971,495 | McGee et al. | Aug. 28, 1934 |
| 2,305,254 | Hirshkorn | Dec. 15, 1942 |
| 2,371,839 | Orelind | Mar. 20, 1945 |
| 2,603,930 | Holmes | July 22, 1952 |
| 2,608,924 | Bywater et al. | Sept. 2, 1952 |
| 2,614,376 | Madsen | Oct. 21, 1952 |